United States Patent
Engheta et al.

(10) Patent No.: US 9,008,471 B2
(45) Date of Patent: Apr. 14, 2015

(54) OPTICAL CIRCUITS AND CIRCUIT ELEMENTS

(75) Inventors: Nader Engheta, Berwyn, PA (US); Alessandro Salandrino, Rome (IT); Andrea Alu, Philadelphia, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 2465 days.

(21) Appl. No.: 11/629,746

(22) PCT Filed: Jun. 20, 2005

(86) PCT No.: PCT/US2005/021785
§ 371 (c)(1),
(2), (4) Date: Aug. 9, 2007

(87) PCT Pub. No.: WO2006/091215
PCT Pub. Date: Aug. 31, 2006

(65) Prior Publication Data
US 2008/0212920 A1    Sep. 4, 2008

Related U.S. Application Data

(60) Provisional application No. 60/581,016, filed on Jun. 18, 2004.

(51) Int. Cl.
*G02B 6/12*       (2006.01)
*G01N 33/551*   (2006.01)
*B82Y 20/00*     (2011.01)
*G02B 6/122*     (2006.01)

(52) U.S. Cl.
CPC ............... *B82Y 20/00* (2013.01); *G02B 6/1226* (2013.01)

(58) Field of Classification Search
None
See application file for complete search history.

(56) References Cited

U.S. PATENT DOCUMENTS

| 6,331,276 | B1 | 12/2001 | Takei et al. | |
|---|---|---|---|---|
| 7,037,729 | B2 | 5/2006 | Nie et al. | 436/535 |
| 8,284,477 | B2 * | 10/2012 | Engheta | 359/328 |
| 2001/0002315 | A1 * | 5/2001 | Schultz et al. | 436/172 |
| 2003/0042487 | A1 * | 3/2003 | Sarychev et al. | 257/53 |
| 2004/0090631 | A1 * | 5/2004 | Elkind et al. | 356/445 |

FOREIGN PATENT DOCUMENTS

| JP | H08-146475 | 7/1996 |
|---|---|---|
| JP | H11-326193 | 11/1999 |

(Continued)

OTHER PUBLICATIONS

Eleftheriades, G.V., et al., Planar negative refractive index media using periodically L-C loaded transmission lines, IEEE Trans. Microwave Theory and Techniques, 2002, 50(12), 2702-2712.

(Continued)

*Primary Examiner* — Tina Wong
(74) *Attorney, Agent, or Firm* — Baker & Hostetler LLP

(57) ABSTRACT

Circuits and circuit elements adapted to function at optical or infrared frequencies are made from plasmonic and/or nonplasmonic particles disposed on a substrate, where the plasmonic and nonplasmonic particles have respective dimensions substantially smaller than a wavelength of an applied optical or infrared signal. Such particles are deposited on a substrate in a variety of shapes and sizes from a variety of plasmonic and/or nonplasmonic materials so as to form resistors, capacitors, inductors and circuits made from combinations of these elements.

34 Claims, 3 Drawing Sheets

(56) References Cited

FOREIGN PATENT DOCUMENTS

| JP | 2003-177911 | 6/2003 |
|---|---|---|
| JP | 2003-531477 | 10/2003 |
| JP | 2004-157326 | 3/2004 |
| JP | 2004-169582 | 6/2004 |
| JP | 2005-016963 | 1/2005 |
| JP | 2005-351941 | 12/2005 |
| JP | 2007-521460 | 8/2007 |
| WO | WO 01/71867 | 9/2001 |
| WO | WO 2005/017525 | 2/2005 |
| WO | WO2006/091215 A3 | 8/2006 |

OTHER PUBLICATIONS

Engheta, N., et al., "Interaction between plasmonic and non-plasmonic nanospheres and their equivalent nano-circuit elements," Dig. USNC-URSI National Radio Science Meeting, Monterey, CA, 2004, p. 276.

Lamprecht, B., et al., "Surface Plasmon propagation in microscale metal stripes," Appl. Phys.Lett., 2001, 79(1), 51-53.

Liu, L., et al., "Forward coupling phenomena between artificial left-handed transmission lines," J. Appl. Phys., 2002, 92(9), 5560-5565.

Sarychev, D.K., et al., "Periodical arrays of optical nanoantennas," Proceedings of SPIE, Complex Mediums, 5218, 2003, 81-92.

Shivets, G., "Photonic approach to making a material with a negative index of refraction," Phys. Rev. B, 2003, 67, 035109-1-035109-8.

Genov, D.A., et al., "Metal-Dielectric Composite Filters with Controlled Spectral Windows of Transparency", Journal of Nonlinear Optical Physics & Materials, Dec. 2003, vol. 12, No. 4, 1-22.

Engheta, N., et al., "Circuit Elements at Optical Frequencies: Nanoinductors, Nanocapacitors, and Nanoresistors", Physical Review Letters, Aug. 2005, vol. 95, No. 9, 095504/1-4.

* cited by examiner

OPTICAL CIRCUITS AND CIRCUIT ELEMENTS

CROSS-REFERENCE TO RELATED APPLICATIONS

This application is the National Stage of International Application No. PCT/US2005/021785, filed Jun. 20, 2005, which claims the benefit of the filing date of U.S. Provisional Application No. 60/581,016, Jun. 18, 2004, the disclosure of which is incorporated by reference in its entirety.

STATEMENT OF FEDERALLY SPONSORED RESEARCH

The U.S. government may have certain rights in the invention described herein, which was made in part with funds from the U.S. Defense Advanced Research Projects Agency (DARPA) Grant number HR0011-04-P-0042 and the U.S. Air Force Office of Scientific Research (AFOSR) Grant number F49PRE-03-1-0438.

FIELD OF THE INVENTION

The present invention relates to circuits and circuit elements that operate in the IR and visible regimes using plasmonic and non-plasmonic nanostructures, and the methods for forming the same.

BACKGROUND OF THE INVENTION

Conventional circuits are known to operate in the lower frequency domains, i.e., the RF and lower frequency ranges. The conventional circuits have well understood and identified circuit elements. Such circuit elements can include those that are much smaller than the wavelength of operation, resulting in the application of circuit theory that is the "approximation" to the Maxwell equations in the limit of such small sizes.

It should be pointed out that a mere scaling of the circuit component concepts conventionally used in the RF and lower frequencies may not work at frequencies beyond the far infrared. The conventional circuits in the RF and lower frequencies rely on the conduction current circulating in metallic wires along the lumped elements. However, the metallic materials cannot be straightforwardly scaled down to the infrared and optical frequencies because at this size the conducting metallic materials behave quite differently.

Accordingly, there still remains a need for circuits and circuit elements that function in the optical and infrared regime. Furthermore, there is a need for products that utilize such optical circuits and circuit elements, including, for example, biological circuits, nano-optics, optical information storage, biophotonics, and molecular signaling.

SUMMARY OF THE INVENTION

Some aspects of the present invention include circuit elements that have been adapted to function at optical or infrared frequencies. These circuit elements comprise plasmonic or nonplasmonic particles disposed upon a substrate, where the plasmonic or nonplasmonic particles have respective dimensions that are substantially smaller than a wavelength of an applied optical or infrared signal.

In other aspects, the invention includes circuits adapted to function at optical or infrared frequencies, such circuits comprising a substrate having a plurality of plasmonic or nonplasmonic particles deposited upon the substrate. In addition, adjacent pairs of the particles are separated from each other by a distance sufficiently small so as to permit optical coupling of the particles upon application of energy of an optical or infrared frequency.

Parallel resonant circuits are provided using the circuits of the invention that are adapted to function at optical or infrared frequencies and comprise a three-dimensional fused particle having a first portion formed of plasmonic material and a second portion formed of non-plasmonic material. The fused particles have an interface formed between the first portion and second portion, and the interface is parallel to an optical field created by applied optical or infrared frequencies. Those skilled in the art will appreciate that optical fields are a type of electromagnetic field and that from time to time such terms may be used interchangeably to describe embodiments of the invention. For example, as described herein, two or more particles may be "coupled," or more specifically, "optically coupled" or connected by "optical coupling." Usually in the IR and visible regime (particularly in the visible regime) the electromagnetic fields are identified specifically as "optical fields".

Series resonant circuits are also provided using the circuits of the invention that are adapted to function at optical or infrared frequencies and comprise three-dimensional fused particles having a first portion formed of plasmonic material and a second portion formed of non-plasmonic material. The fused particles have an interface formed between the first portion and second portion, and the interface is normal to an optical field created by the applied optical or infrared frequencies.

Nanoscale circuits may be provided in accordance with the invention that are adapted to function at optical or infrared frequencies, such circuits include a plurality of nanoparticles comprised of plasmonic or non-plasmonic materials. The plurality of nanoparticles are deposited onto a substrate so that adjacent nanoparticles are in close enough proximity for optical coupling. The nanoscale circuits can be architected to perform a predetermined circuit function based on the properties of each one of the plurality of nanoparticles. For example, the predetermined circuit function may be a right-handed transmission line or a left-handed transmission line.

Other aspects of the present invention include methods of forming circuit elements adapted to function at optical or infrared frequencies, comprising the steps of depositing on a substrate at least one of a plasmonic or nonplasmonic particle having respective dimensions substantially smaller than a wavelength of an applied optical or infrared signal; and applying energy of an optical or infrared frequency so as to cause a plasmonic particle to function as an inductor and a nonplasmonic particle to function as a capacitor at said optical or infrared frequencies. Certain other aspects include methods of fabricating circuits adapted to function at optical or infrared frequencies, comprising forming the circuit element and further depositing an additional particle onto the substrate at a distance sufficiently small so as to permit optical coupling of the particles.

BRIEF DESCRIPTION OF THE DRAWINGS

The present invention will be apparent from the following detailed description of the invention taken in conjunction with the accompanying drawings, of which.

DETAILED DESCRIPTION OF ILLUSTRATIVE EMBODIMENTS

Figure 1:
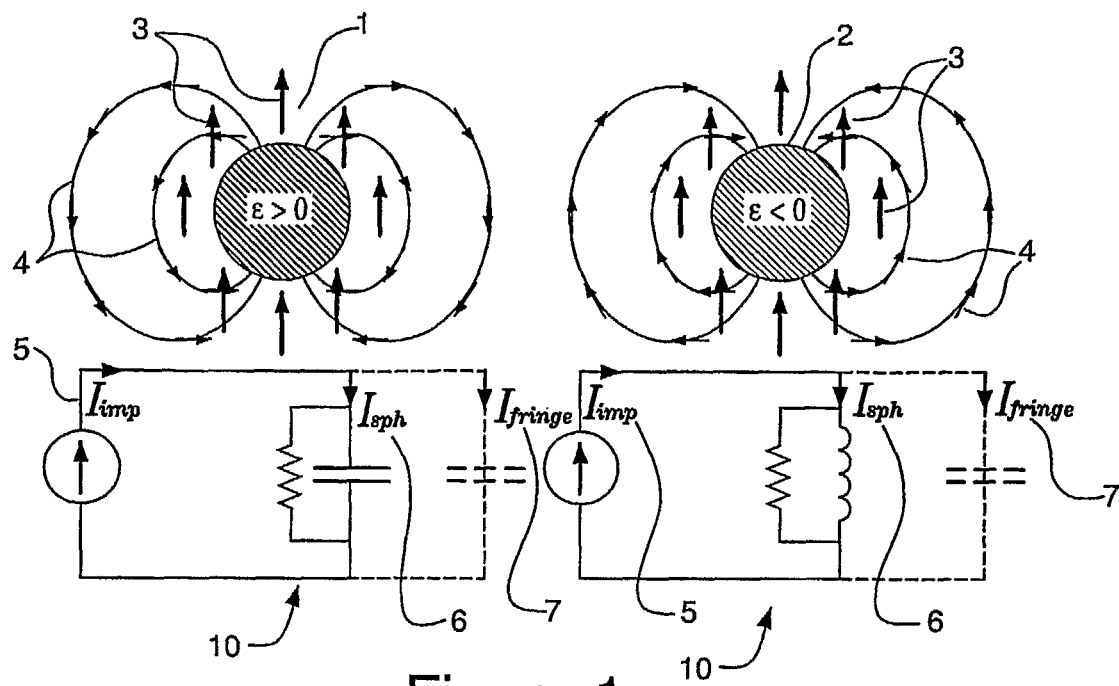
FIG. 1 illustrates a basic nanoscale circuit in the optical (or infrared) regime, using the interaction of an optical wave with an individual nanosphere.

The invention will be described in detail below with reference to FIGS. 1 through 5. Those skilled in the art will appreciate that the description given herein with respect to those figures is for exemplary purposes only and is not intended in any way to limit the scope of the invention, which are determined by the provided appended claims.

Definitions

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an" are used herein to describe elements and components of the invention. This is done merely for convenience and to give a general sense of the invention. This description should be read to include one or at least one and the singular also includes the plural unless it is obvious that it is meant otherwise.

The prefix "nano" when used to qualify the size of the particles of the present invention generally refers to sizes in the nanometer range; however, as used herein, "nano" can also include sizes in the lower micron ranges, i.e., on the order of 1 micron, as long as the size of the particles are still substantially smaller than the wavelength of the applied optical or infrared signal.

The phrase "adapted to function at optical or infrared frequencies" is used herein to refer to circuits or circuit elements that have properties that are analogous to their counterpart circuit or circuit element in the electrically conductive models that operate in the lower frequencies, e.g., microwave regime. Additionally, the term "optical circuit" or "optical circuit element" is used to refer to these same circuits or circuit elements that are adapted to function at optical or infrared frequencies.

The phrase "substantially smaller than a wavelength of an applied optical or infrared signal" is used herein to refer to particles that form optical circuit elements that have a size that is much smaller than the wavelength of operation in vacuum and in the material. For example, in embodiments where the particle is a sphere, $R \ll \lambda_0$ and $R \ll \lambda_0 / \sqrt{Re(\epsilon)/\epsilon_0}$ where $\lambda_0$ is from about 380 nm to about 10 µm, which generally understood to be within the optical and IR range.

The term "plasmonic" or "plasmonic particle" or "plasmonic material" is used herein to refer to metal materials, preferably noble metals, that have a permittivity $\epsilon$ that has a negative real part. This results in formation of surface plasmon resonances upon the interaction of optical signals with the plasmonic particles, which also results in the plasmonic particle exhibiting effective inductance. It is generally known that for noble metals such as Ag, Au, the plasma frequency is in the visible or ultraviolet (UV) regimes, and thus these metals behave as plasmonic materials in the optical frequencies, i.e., their permittivity has a negative real part. Those skilled in the art will appreciate that silver has lower loss than gold in the visible domain. As a result, the interaction of optical signals with plasmonic nanoparticles involves surface plasmon resonances, e.g., see C. F. Bohren, and D. R. Huffman, *Absorption and Scattering of Light by Small Particles* (Wiley, New York, 1983) and B. Lamprecht, et al., Appl. Phys. Lett., 79, 51 (2001).

The term "effective inductance" refers to properties analogous to an inductor as understood in the field of electrically conductive circuits, e.g., circuits operating in microwave frequencies.

The term "nonplasmonic" or "nonplasmonic particle" or "nonplasmonic material" is used herein to refer to non-metallic materials, e.g. $Au_2S$ and oxides such as $SiO_2$, that have a permittivity $\epsilon$ that has a real part of that is positive. Such particles do not undergo surface plasmon resonances upon the interaction of optical signals with the plasmonic particles, but does result in the nonplasmonic particle exhibiting effective capacitance. The term "effective capacitance" refers to properties analogous to a capacitor as understood in the field of electrically conductive circuits, e.g., circuits operating in microwave frequencies.

The term "effective resistance" or "resistance," as applied to optical circuits, refers to properties analogous to a resistor as understood in the field of electrically conductive circuits, e.g., circuits operating in microwave frequencies. Both plasmonic and nonplasmonic particles can have a permittivity that has a positive imaginary part that exhibits effective resistance.

The phrase "close proximity to another particle [or another plasmonic or nonplasmonic particle] so as to permit optical coupling of the particles" refers to the distance between two adjacent particles that allows for optical coupling. Preferably, this distance is substantially smaller than a wavelength of an applied optical or infrared signal. In some instances, the adjacent particles are fused together, thereby forming an interface. In the upper limits, when considering a far IR signal at 10 microns, it may be possible to consider particles around 1 micron size. The term "optical coupling" or "coupling" is used herein to refer to the phenomena of the influence of the field of one particle on the adjacent particle(s). In other words, the interaction among the particles can be exhibited as dependent sources with respect to one another. As an example, the value of each dependent current source can be seen in a pair of adjacent spherical particles in FIG. 2, which can be explicitly derived in terms of the potential difference across the other nanosphere.

The term "interface" is used herein to refer to the two-dimensional intersection between two portions of a particle or the union of two particles. In one example, where the particle is a sphere, the interface is a plane.

Exemplary Embodiments

The present invention relates to circuit elements that have been adapted to function at optical or infrared frequencies. These circuit elements comprise plasmonic or nonplasmonic particles disposed upon a substrate, wherein the plasmonic or nonplasmonic particles have respective dimensions that are substantially smaller than a wavelength of an applied optical or infrared signal. The plasmonic particles preferably have a permittivity having a negative real part when exposed to optical and infrared frequencies. The plasmonic particles are formed from metal materials, preferably noble metals, and, more preferably, silver or gold. In addition, the plasmonic particles have a permittivity having a positive imaginary part when exposed to optical and infrared frequencies. On the other hand, the nonplasmonic particles are formed from non-metallic materials, preferably $Au_2S$ or oxides such as $SiO_2$. In addition, the nonplasmonic particles preferably have a permittivity having a positive real part when exposed to optical and infrared frequencies.

The characteristic of the circuit element formed from the plasmonic or nonplasmonic particle is determined by the size, shape, and material that is representative of the plasmonic or nonplasmonic particle, e.g., the induction produced from a plasmonic particle. For example, if a certain optical inductor is desired, then one can select a noble metal to form a plasmonic particle. Furthermore, knowing the desired circuit element characteristic, the shape and size of the plasmonic particle can be determined using the calculations provided, herein. Additionally, the wavelength of the optical or infrared light source is to be selected, accordingly, with respect to the selected size, shape and material of the desired particle.

In a further example, if a certain optical capacitor is desired, then one can select from non-metallic material to form the nonplasmonic particle, e.g., $Au_2S$ or oxides such as $SiO_2$. Thereafter, the size and shape, and wavelength of light source to be used, can be determined using the provided calculations to achieve the desired optical capacitance. It is preferable that the plasmonic particle exhibit resonance—whereas the nonplasmonic particle does not exhibit resonance—upon application of the selected optical or infrared light source.

The plasmonic or nonplasmonic particles of the invention additionally can function analogous to an electrical circuit resistor upon exposure to a light source in the optical or infrared frequencies. The resistor function of either the plasmonic or nonplasmonic particles can be attributed to the positive imaginary part of the permittivity. The materials forming both types of particles are passive materials, and a resistor is also a passive material. One of ordinary skill will understand that the mathematical sign of the imaginary part of the permittivity depends on the convention used in the relative scientific community. For example, in the physics community, a passive material has a positive imaginary part for the permittivity; however, in the electrical engineering community, the same material is described with a negative imaginary part for the permittivity. The descriptions herein use the convention of the physics community.

The invention also includes circuits adapted to function at optical or infrared frequencies, which are comprised of a substrate having a plurality of particles deposited upon the substrate. The deposited particles are either the plasmonic particles or the nonplasmonic particles. In addition, adjacent pairs of the particles are separated from each other by a distance sufficiently small so as to permit optical coupling of the particles upon application of energy of an optical or infrared frequency. In some embodiments, adjacent pairs of particles are fused to one another and thereby form an interface therebetween. Preferably, the interface is substantially planar.

Some aspects of the present invention provide for parallel resonant circuits that are adapted to function at optical or infrared frequencies, which are comprised of a three-dimensional fused particle, the fused particle comprised of a first portion of plasmonic material and a second portion of non-plasmonic material; wherein an optical field created by the optical or infrared frequencies is parallel to an interface formed between the first portion and second portion. Preferably, the three-dimensional fused particle has a ellipsoidal cross-section, and, more preferably, a sphere. Where the three-dimensional fused particle is a sphere, the interface is an equator, the first portion is a first hemisphere, and the second portion is a second hemisphere.

Series resonant circuits are also provided that are adapted to function at optical or infrared frequencies, comprising a three-dimensional fused particle having a first portion of plasmonic material and a second portion of non-plasmonic material; wherein an optical field created by the optical or infrared frequencies is normal to an interface formed between the first portion and second portion. Preferably, the three-dimensional fused particle has a ellipsoidal cross-section, and, more preferably, a sphere. Where the three-dimensional fused particle is a sphere, the interface is an equator, the first portion is a first hemisphere, and the second portion is a second hemisphere.

In some embodiments of the invention, the plurality of particles are architected to perform a predetermined circuit function based on the properties of each one of the plurality of nanoparticles. Some of the embodiments have the predetermined circuit function that is a right-handed transmission line; whereas some of the embodiments have the predetermined circuit function that is a left-handed transmission line.

Other aspects of the present invention include methods of forming circuit elements adapted to function at optical or infrared frequencies, comprising depositing on a substrate at least one of the plasmonic or nonplasmonic particles having respective dimensions substantially smaller than a wavelength of an applied optical or infrared signal; and applying energy of an optical or infrared frequency so as to cause the plasmonic particle to function as an inductor and the nonplasmonic particle to function as a capacitor at said optical or infrared frequencies.

In other aspects, the invention includes methods of fabricating circuits adapted to function at optical or infrared frequencies comprising forming the circuit elements, as above, and further depositing an additional particle onto the substrate at a distance sufficiently small so as to permit optical coupling of the particles. In some embodiments, the optically coupled particles are fused, thereby forming an interface therebetween.

The following nanosphere is used for illustrative purposes only. This three-dimensional shape was selected in part to simplify the overall mathematical calculations in determining the nanoparticles' response to optical energy in the optical and infrared frequencies. Use of this specific three-dimensional geometry is not meant to be limiting, as the following calculations can be adapted by those skilled in the art to determine the characteristic of any different three-dimensional shaped nanoparticle, whatever the geometry, as it responds to wavelengths in the optical and infrared ranges.

A nanosphere of radius R can be made of a homogeneous material with dielectric function $\in(\omega)$, which is in general a complex quantity. The sphere can be much smaller than the wavelength of operation in vacuum and in the material, i.e., $R<<\lambda_0$ and $R<<\lambda_0/\sqrt{Re(\in)/\in_0}$. An incident electromagnetic wave $E_0$ can illuminate the sphere under a monochromatic excitation $e^{-i\omega t}$. Due to the small size of the particle with respect to the wavelength, the scattered electromagnetic fields in the vicinity of the sphere and the total fields inside it may be obtained with very good approximation using the well known time-harmonic, quasi-static approach. This leads to the following approximate expressions for the fields inside and outside the sphere (e.g. See J. D. Jackson, *Classical Electrodynamics* (John Wiley & Sons, New York, 1999):

$$E_{int} = \frac{3\varepsilon_0}{\varepsilon + 2\varepsilon_0} E_0, \quad (1)$$

$$E_{ext} = E_0 + E_{dip} = E_0 + \frac{3u(p \cdot u) - p}{4\pi\varepsilon_0 r^3}, \quad (2)$$

with $$p = 4\pi\varepsilon_0 R^3 \frac{\varepsilon - \varepsilon_0}{\varepsilon + 2\varepsilon_0} E_0, \, u = r/r, \, \varepsilon_0$$

being the permittivity of the outside region, r being the position vector from the sphere's center to the observation point, and r=|r|. At every point on the surface of the sphere the normal component of the displacement current $-i\omega D_n$ is continuous, implying that:

$$-i\omega(\epsilon - \epsilon_0) E_0 \cdot \hat{n} = -i\omega\epsilon_0 E_{dip} \cdot \hat{n} + i\omega\epsilon E_{res} \cdot \hat{n}, \quad (3)$$

where n̂ is the local outward unit vector normal to the surface of the sphere. In this equation, $E_{res} = E_{int} - E_0$ represents the residual field internal to the nanosphere when the incident field is subtracted from the total internal field.

A nanosphere of radius R is illustrated in FIG. 1. A non-plasmonic sphere 1 with ∈>0 is shown in FIG. 1 as providing nanocapacitor and a nanoresistor functions in the optical regime. In addition, a plasmonic sphere 2 with ∈<0 is also shown in FIG. 1 as providing a nanoinductor and a nanoresistor in the optical regime. The incident electric field 3 is shown affecting the particles, as shown by the solid black arrows. The fringe dipolar electric field 4 produced by each of the nanospheres can be seen, as represented by the thinner field lines together with the grey arrows.

$E_0$ can be oriented as shown by the black arrows in FIG. 1, which is the incident electric field 3. When Eq. (3) is integrated over the upper hemispherical surface we get the "total" displacement current for each relevant term in Eq. (3):

$$\underbrace{-i\omega(\varepsilon - \varepsilon_0)\pi R^2 |E_0|}_{I_{imp}} = \underbrace{-i\omega\varepsilon\pi R^2 \frac{\varepsilon - \varepsilon_0}{\varepsilon + 2\varepsilon_0} |E_0|}_{I_{sph}} - \underbrace{i\omega\varepsilon_0 2\pi R^2 \frac{\varepsilon - \varepsilon_0}{\varepsilon + 2\varepsilon_0} |E_0|}_{I_{fringe}}. \quad (4)$$

The three terms in Eq. (4) have been named according to their function: the "impressed displacement current source" $I_{imp}$ 5, the "displacement current circulating in the nanosphere" $I_{sph}$ 6, and the "displacement current of the fringe (dipolar) field" $I_{fringe}$ 7, respectively. All of them are related to the polarization charges on the surface of the nanosphere, induced by the excitation. The above relationship among the various segments of the displacement current can be interpreted as the branch currents at a node in a parallel circuit 10, as shown in FIG. 1. Indeed, such currents as defined above obey the Kirchhoff current law, represented by Eq. (4). The Kirchhoff voltage law is also satisfied, since ∇×E is locally near zero in this quasi-static approximation.

The equivalent impedance for the "nanosphere" and the "fringe" branches of the circuit, shown in FIG. 1, can be calculated as the ratio between the "average" potential difference (due to $E_{res}$) between the upper and lower hemispherical surfaces of the sphere $$\langle V \rangle_{sph} = \langle V \rangle_{fringe} = R \frac{\varepsilon - \varepsilon_0}{\varepsilon + 2\varepsilon_0} |E_0| \quad (5)$$

and the effective currents evaluated in Eq. (4). Thus, we get:

$$Z_{sph} = (-i\omega\in\pi R)^{-1}, \, Z_{fringe} = (-i\omega 2\pi R\in_0)^{-1}. \quad (6)$$

From Eq. (6) it can be clearly seen that the two parallel elements in the circuits shown in FIG. 1 may behave differently according to the sign of the nanosphere's permittivity. Consider the following two cases.

Non-Metallic (i.e., Non-Plasmonic) Sphere as a Nano-Capacitor

In this case, the real part of ∈ is a positive quantity; thus $Z_{sph}$ in Eq. (6) is capacitive, while having a resistive part that is related to the imaginary part of permittivity. The impedance of the outside fringe is always capacitive because the permittivity of the outside region can be assumed to be positive. Thus, the equivalent nano-circuit for a non-plasmonic nanosphere, which is small compared with the optical wavelength, can be shown as in the bottom left part of FIG. 1. Here the equivalent circuit elements can be expressed in terms of parameters of the nanospheres as follows:

$$C_{sph} = \pi R Re[\in], \, G_{sph} = \pi\omega R Im[\in], \, C_{fridge} = 2\pi R \in_0 \quad (7)$$

Since there are two capacitive elements, there is no resonance present in this case—a fact that is consistent with the absence of resonance for optical wave interaction with the small non-plasmonic nanosphere.

Metallic (i.e., Plasmonic) Sphere as a Nano-Inductor

In this case, the sphere can be made of a plasmonic material, such as noble metals in the visible or IR band (e.g., Ag, Au), which results in the real part of the permittivity of the material having a negative value in these frequency bands. Therefore, the equivalent impedance of the nanosphere (Eq. 6) can be "negatively capacitive", which implies that at any given frequency for which Re[∈]<0, the equivalent capacitance is "negative". This can be interpreted as a positive effective "inductance", as discussed in A. K. Sarychev, D. A. Genov, A. Wei, and V. M. Shalaev, Proceedings of SPEE, Complex Mediums IV, 81 (2003); G. V. Eleftheriades, A. K. Iyer, and P. C. Kremer, IEEE Trans. Microwave Theory Tech, 50, 2702 (2002); and N. Engheta, N. Bliznyuk, A. Alù, A. Salandrino, Dig. USNC-URSI National Radio Science Meeting, Monterey, Calif., 276 (2004). Therefore, the equivalent circuit for the case of optical wave interaction with a plasmonic nanosphere is represented in the bottom right of FIG. 1.

The equivalent circuit element for a sphere formed of plasmonic material can be calculated as:

$$L_{sph} = (-\omega^2 \pi R Re[\in])^{-1}. \quad (8)$$

In this case, since there is an inductor in parallel to the fringe capacitor, the circuit may exhibit resonance. This resonance corresponds to the plasmonic resonance in response to the optical wave interaction with metallic nanoparticles, as mentioned in A. K. Sarychev, D. A. Genov, A. Wei, and V. M. Shalaev, Proceedings of SPIE, Complex Mediums IV, 81 (2003). It may be verified that the resonant condition for the circuit $L_{sph} C_{sph} = \omega^{-2}$ requires the well known condition of plasmonic resonance for a nanosphere Re[∈]=−2∈₀ (C. F. Bohren, and D. R. Huffman, *Absorption and Scattering of Light by Small Particles* (Wiley, New York, 1983).

Accordingly, a small nanosphere excited by an optical (or infrared) signal may effectively behave as a "nano-capacitor" or a "nano-inductor"—analogous to the respective circuit elements in an electrically conductive circuit—at the optical frequency, if the sphere is made of non-plasmonic or plasmonic materials, respectively. The imaginary part of the material permittivity can provide an equivalent nano-resistor—these resistors can be either a plasmonic or nonplasmonic particles as long as they have some non-zero imaginary part in the permittivity. Unlike the conventional design for an inductor in the lower frequency regimes, where the inductor is usually in the form of "wound wires", the present inductors operating in the optical and infrared regimes is made of a simple geometry consisting of plasmonic materials. In other words, instead of winding wires with dimensions much smaller than the optical wavelength, here the plasmonic characteristics of natural noble metals provide an effective inductance, whose value can be designed by properly selecting the size, shape, and material contents of the nanostructure. Modulation of these parameters can result in achieving the desired effective inductance.

The described circuit elements for the optical and infrared regimes provide new possibilities for miniaturization of circuits. Conventional circuits in the RF and lower frequencies, which relying on the conduction current circulating in metallic wires along the lumped elements, cannot be straightforwardly scaled down to the infrared and optical frequencies. At these high frequencies, the conducting metallic materials behave quite differently. However, introducing plasmonic and non-plasmonic nanoparticles as basic elements of optical nanocircuits, in which effectively the "displacement" current can similarly "circulate", can now provide for analogous functionalities at the optical frequencies. One can essentially have the three basic circuit elements, i.e., nano-inductor, nano-capacitor, and nano-resistor, operating in the optical frequency, which form the building blocks for the design of more complex circuits at these wavelengths.

For any given wavelength and specific material, the values of these optical circuit elements depend directly on the size and shape of the particles, e.g., for the nanosphere, this would be calculated from the radius. However, if one wants to have more flexibility (i.e., more degrees of freedom) in their design, one can use nanoparticles with different geometries, e.g., ellipsoidal nanoparticles, where there are three geometrical parameters, corresponding to the three axes that can be manipulated to achieve the desired result, whether inductance, capacitance, or resistance.

Figure 2:
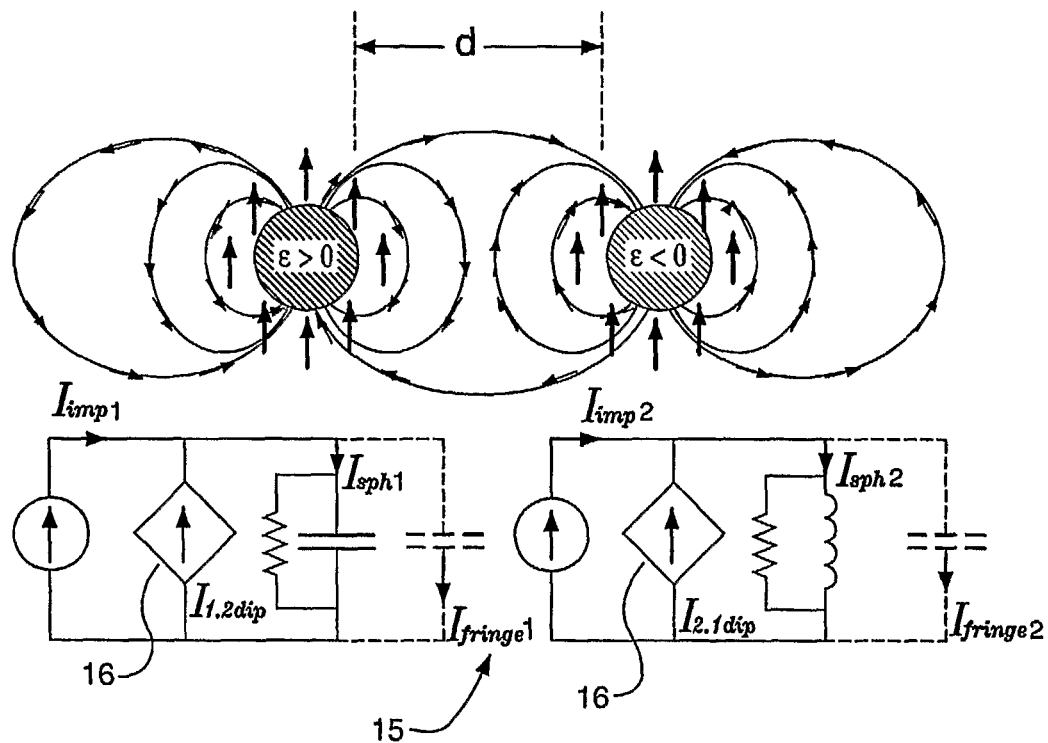
FIG. 2 illustrates a coupled nanoscale circuit in the optical domain using optical wave interaction between two adjacent nanospheres.

In aspects of the invention having more than one nanoparticle, e.g., the case of two nanospheres with radii $R_1$ and $R_2$, permittivities $\in_1$ and $\in_2$, and with a certain distance d apart, an electromagnetic analysis of the field distribution shows that in the quasi-static limit considered here, these configurations may be effectively treated as "coupled" nano-circuits 15, each representing one of the spheres. FIG. 2 illustrates a coupled nanoscale circuit in the optical domain using optical wave interaction between two adjacent nanospheres. Each circuit in the figure includes the capacitive or inductive impedance of the given nanosphere, the capacitive impedance related to the fringe field, and the current source representing the impressed field on this sphere. Furthermore, each circuit also needs to have a dependent current source 16, representing the influence of the field of other particle(s) on an adjacent sphere. In other words, the interaction among the particles is defined by such dependent current sources 16. The value of each dependent current source in FIG. 2 may be explicitly derived in terms of the potential difference across the other nanosphere, analogous with the previous formulas.

Figure 3:
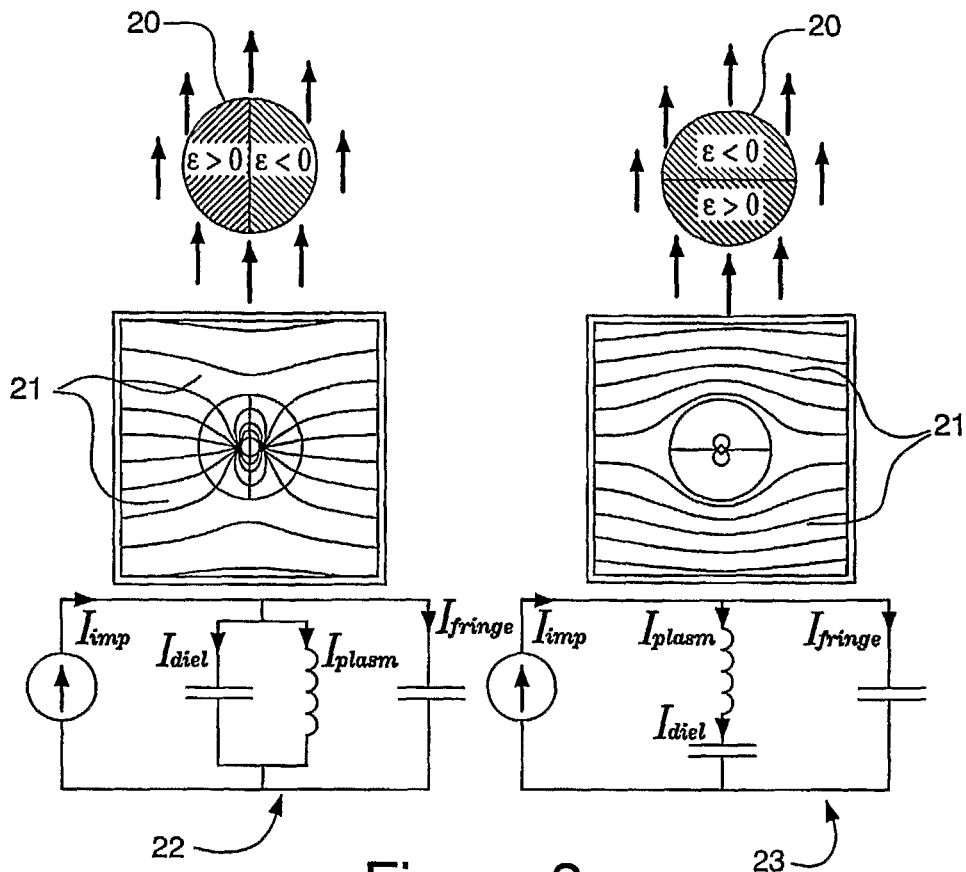
FIG. 3 illustrates both parallel and series nano-elements.

In order to form parallel or series circuit elements with these nanoparticles, one would need to juxtapose two (or more) of them very closely with specific orientations with respect to the illuminating electric field. The top row of FIG. 3 shows two fused particles 20, which are nanoparticles consisting of two tightly paired semi-cylinders of differing permittivities, one positive and one negative. To simplify the mathematical calculations, lossless cylinders are considered. The potential distribution around this fused structure, when illuminated with an electric field, provides useful information about its behavior as combined circuit elements. The middle row of FIG. 3 shows quasi-static potential distributions and equipotential surfaces 21 around and within the structure. The equipotential surfaces 21 are designated by the solid lines. The potential distraction and equipotential surfaces 21 are shown for two cases of electric field: one being parallel (left column) and one being perpendicular (right column) to the plane interface between the two halves, which have permittivities $\in$ and $-\in$. (Since the diameter of the semi-cylinders is assumed to be much smaller than the operating wavelength, an approximate time-harmonic quasi-static analysis is used for evaluating the potential distribution here, and no higher-order mode needs to be considered.) The equipotential surfaces 21 near the fused cylinder in the left column of FIG. 3 become perpendicular to its outer surface, implying that the normal component of the total electric field is zero at this surface. However, there is indeed a certain potential difference between the top and bottom parts of the cylinder's surface. As seen from the outside, this fused structure can be regarded as a parallel resonant L-C circuit (which in tact has an infinite impedance at its resonance, and hence zero net current flowing into it), in parallel with the fringe capacitor.

In an analogous way, the fused semi-cylinders in the right column of this figure, having the external electric field perpendicular to the boundary interface between the two halves, can be regarded as a series resonant L-C circuit, as observed from the outside. In fact, as seen in the middle right panel, the equipotential surfaces 21 in this case become parallel with the fused cylinder's surface, implying that the potential difference at the surface of this structure is effectively zero, whereas the displacement current flows in and out of it. The resonant behavior of these examples is present due to the particular choice of oppositely signed (but equal magnitude) permittivities for the two halves. However, different pairs would behave as non-resonant series or parallel elements, depending upon their pairing and orientation with the external excitation. Moreover, other geometries for nanostructures similarly paired may lead to analogous parallel and series configurations.

The bottom row show the equivalent circuits that illustrate the parallel and series elements representing the fused structure as seen from the outside. The parallel resonant L-C circuit 22 is depicted in circuit diagram in FIG. 3. (Since the materials are assumed to be lossless, no equivalent resistor is present here, but it may be easily added.) The series resonant L-C circuit 23 is also depicted in circuit diagram in FIG. 3.

Figure 4:
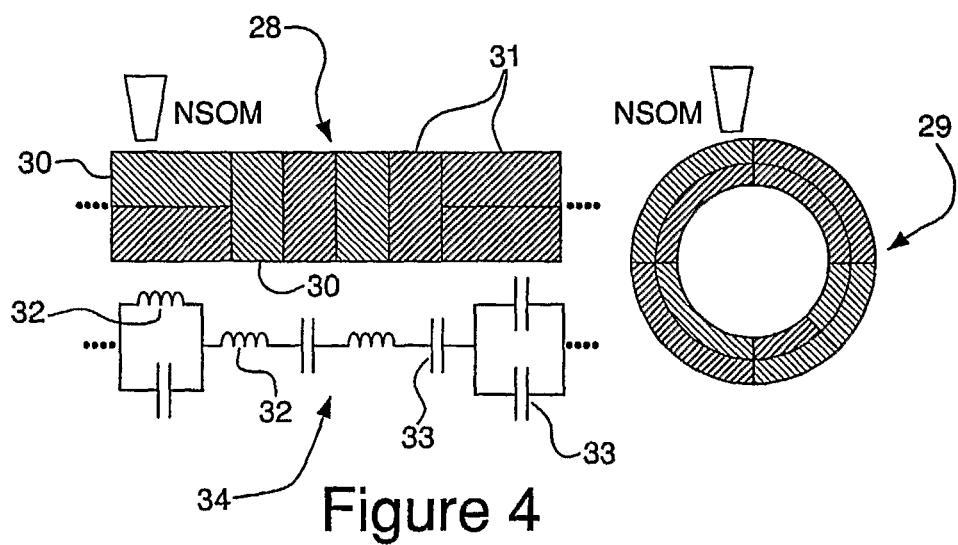
FIG. 4 illustrates two versions of possible nanocircuits.

FIG. 4 illustrates two different embodiments of a nanoscale circuit, or an optical circuit, that is formed by a plurality of portions of either three-dimensional plasmonic or nonplasmonic material. A first embodiment, a rectangular segmented optical circuit 28, is shown in FIG. 4 as rectangular blocks of plasmonic 30 and non-plasmonic segments 31. A second embodiment comprises a similar nanoscale circuit that is a closed circuit, or a closed nano-loop optical circuit 29, and is shown comprising arc-shaped blocks of plasmonic 30 and non-plasmonic segments 31 in FIG. 4. When this rectangular segmented optical circuit 28 is excited by a local electric field of an optical signal (e.g., by a near-field scanning optical microscope (NSOM)) the plasmonic 30 and non-plasmonic 31 "blocks" may act as nano-inductors 32 and nano-capacitors 33 (along with some nano-resistor, not shown to keep circuit diagram simple), respectively, and the structure may thus operate as the more complex circuit 34, as depicted in FIG. 4. Such nano-scale complex circuits 34 can indeed behave as plasmonic nano-barcodes and plasmonic data storage systems. When nano-loop optical circuit 29 is excited by an NSOM at one point, it is speculated that the displacement current along this loop may behave as the current in a circuit formed by equivalent inductors and capacitors. Additionally, optical circuits can be interfaced with biological elements, such as molecules, which substitute one of the plasmonic 30 or non-plasmonic 31 elements in the circuit and, thereby, factor into the overall response of the optical circuit to optical or infrared light. By solving for the effect the biological element has on the circuit, information about that particular biological element can be determined.

Figure 5:
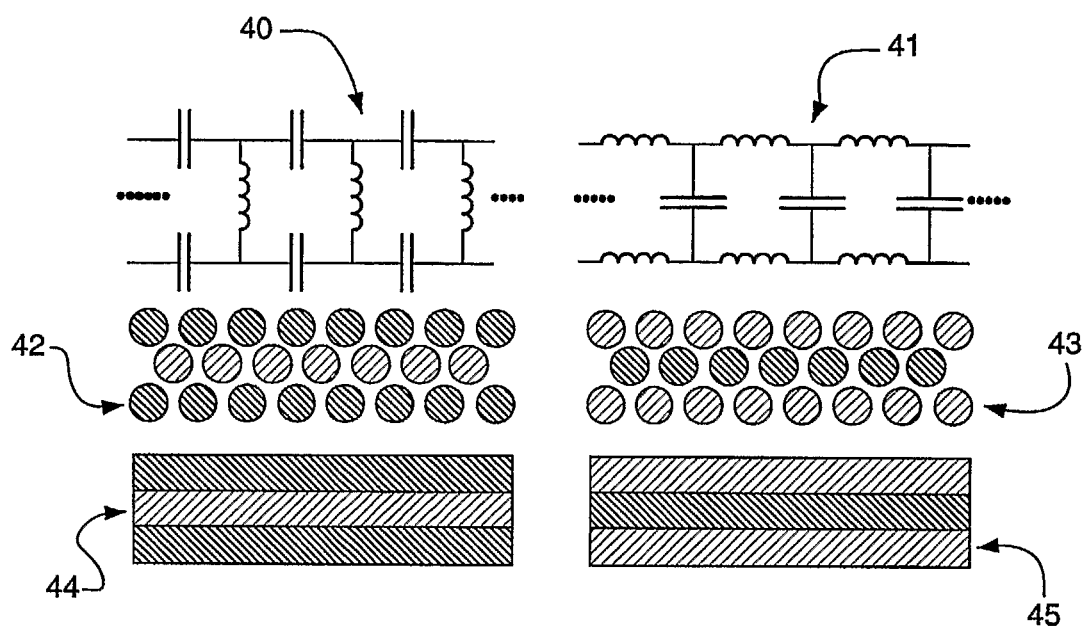
FIG. 5 illustrates a nanocircuit in the form of either a right-handed (RH) and left-handed (LH) nano-transmission line.

In some examples of optical circuits, nano-inductors and nano-capacitors in the optical frequency can be properly arranged to form optical nano-transmission lines. The top row of FIG. 5 shows a conventional LH transmission line 40 and RH transmission line 41 using distributed (or lumped) inductor and capacitor elements as a circuit diagram. The middle row of FIG. 5 illustrates a nano-scale complex circuit comprising plasmonic and non-plasmonic nanostructures that function as nanoinductors and nanocapacitors, respectively, in the form of either a left-handed (LH) nanoscale transmission line 42 or a right-handed (RH) nanoscale transmission line 43 transmission. If the arrangement involves series nano-inductors and shunt nano-capacitors, for the dominant even mode this will provide conventional (also known as right-handed (RH)) transmission lines 43 in the optical frequency. However, if the shunt nano-inductors and series nano-capacitors are used, negative-index (or left-handed (LH)) transmission lines 42 can be synthesized in the optical domain. This is analogous to that discussed in G. V. Eleftheriades, A. K. Iyer, and P. C. Kremer, IEEE Trans. Microwave Theory Tech, 50, 2702 (2002) and L. Liu, et al., J. Appl. Phys., 92, 5560 (2002) with respect to microwaves. This may lead to interesting sub-wavelength focusing effects in the optical frequencies. The planar RH and LH structures are consistent with the planar geometries suggested in G. Shvets, Phys. Rev. B. 67, 035109 (2003), albeit arrived at with a different approach. The distances between the nanoparticles can be reduced to the extent that there is virtually a uniform layer without any distance between adjacent nanoparticles, essentially forming a layer of fused nanoparticles. This results in plasmonic and non-plasmonic layers forming alternating layered structures with forward and backward propagation properties. The bottom row of FIG. 5 shows a representative LH nanoscale transmission line 44 and a corresponding RH nanoscale transmission line 45.

EXAMPLES

The following examples are provided to illustrate embodiments of aspects of the present invention in greater detail. The examples are for illustrative purposes only, and are not intended to limit the invention.

Example 1

Nanoinductor Optical Circuit Element

A three dimensional particle in the shape of a sphere having a radius R=30 nm is formed using silver. At the wavelength $\lambda_0$=633 nm, the permittivity of silver is known to be $\in_{Ag}$=(−19+i0.53)$\in_0$ (See P. B. Johnson, and R. W. Christy, Phys. Rev. B, 6, 4370 (1972)). From Eq. (8), the particle is determined to exhibit nanoinductance $L_{sph}$=7.12 femtoH upon exposure to light having a wavelength $\lambda_0$=633 nm.

Example 2

Nanocapacitor Optical Circuit Element

A three dimensional particle in the shape of a sphere having a radius R=30 nm is formed using Au$_2$S. At the wavelength $\lambda_0$=633 nm, the permittivity of $\in_{Au_2S}$=5.44$\in_0$. The nanocapacitance exhibited by the sphere is determined to be $C_{sph}$=4.53 attoF upon exposure to light having a wavelength $\lambda_0$=633 mm.

Example 3

Left Handed Nanoscale Transmission Line

A nanocircuit in the form of a left-handed (LH) nanoscale transmission line is formed by depositing a first uniform layer of non-plasmonic nanoparticles onto a substrate. Each non-plasmonic nanoparticle is separated from an adjacent non-plasmonic nanoparticle by a distance substantially small enough to permit optical coupling. This separation distance is maintained throughout the layer. A uniform layer of plasmonic nanoparticles is then elaborated over the first uniform layer of non-plasmonic nanoparticles. As with the first uniform layer, each plasmonic nanoparticle is separated from an adjacent plasmonic nanoparticle by a distance substantially small enough to permit optical coupling. Also, the separation distance is maintained throughout the layer. To this layer of plasmonic nanoparticles, another uniform layer of non-plasmonic nanoparticles is deposited onto the uniform layer of plasmonic nanoparticles. The properties of this layer being similar to that of the first uniform layer. The alternating layers produce, in effect, shunt nano-inductors and series of nano-capacitors, thereby forming a negative-index (or left-handed (LH)) transmission line that operates in the optical domain.

Example 4

Right Handed Nanoscale Transmission Line

A nanocircuit in the form of a right-handed (RH) nanoscale transmission line is formed by depositing a first uniform layer of plasmonic nanoparticles onto a substrate. Each plasmonic nanoparticle is separated from an adjacent plasmonic nanoparticle by a distance substantially small enough to permit optical coupling. This separation distance is maintained throughout the layer. A uniform layer of non-plasmonic nanoparticles is then elaborated over the first uniform layer of plasmonic nanoparticles. As with the first uniform layer, each non-plasmonic nanoparticle is separated from an adjacent non-plasmonic nanoparticle by a distance substantially small enough to permit optical coupling. Also, the separation distance is maintained throughout the layer. To this layer of non-plasmonic nanoparticles, another uniform layer of plasmonic nanoparticles is deposited onto the uniform layer of non-plasmonic nanoparticles. The properties of this layer being similar to that of the first uniform layer. The alternating layers produce, in effect, series nano-inductors and shunt nano-capacitors, thereby forming a conventional (also known as right-handed (RH)) transmission line that operates in the optical domain.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Those skilled in the art will also appreciate that numerous other modifications to the invention are possible within the scope of the invention. For example, a nanoparticle can comprise a mix of plasmonic and non-plasmonic materials. However, this would be similar to having a nanoparticle with several segments of plasmonic and non-plasmonic materials. Such a nanoparticle can function as a mix of inductors and capacitors. Accordingly, the scope of the invention is not intended to be limited to the preferred embodiments described above, but only by the appended claims.

What is claimed is:

1. A circuit element adapted to function at optical or infrared frequencies, comprising a substrate and disposed on said substrate at least one of (1) a plasmonic particle comprised of a material having a permittivity with a negative real part and adapted to induce inductance upon application of an optical or infrared signal, (2) a nonplasmonic particle comprised of a material having a permittivity with a positive real part and adapted to exhibit capacitance upon application of an optical or infrared signal, and (3) a plasmonic or nonplasmonic particle comprised of a material having a permittivity with a positive imaginary part and adapted to exhibit resistance upon application of an optical or infrared signal, said plasmonic and/or nonplasmonic particle disposed on said substrate having respective dimensions substantially smaller than a wavelength of an applied optical or infrared signal and having a size and shape that determine the characteristics of the circuit element at optical or infrared frequencies, wherein the plasmonic and/or nonplasmonic particles perform functions upon application of energy in the optical or infrared frequency range analogous to functions performed by one or more electrical circuit elements upon application of energy in the RF or microwave frequency range.

2. The circuit element of claim 1, wherein a plasmonic particle is disposed on said substrate in close proximity to a nonplasmonic particle so as to permit optical coupling of the particles upon application of energy of an optical or infrared frequency.

3. The circuit element of claim 2, wherein a plasmonic particle and a nonplasmonic particle are fused to one another thereby forming an interface therebetween.

4. The circuit element of claim 3, wherein the interface is substantially planar.

5. The circuit element of claim 1, wherein the plasmonic particle is comprised of a noble metal.

6. The circuit element of claim 5, wherein the noble metal is silver or gold.

7. The circuit element of claim 5, wherein the plasmonic particle exhibits resonance upon application of energy of an optical or infrared frequency.

8. The circuit element of claim 1, wherein the nonplasmonic particle is comprised of non-metallic material.

9. The circuit element of claim 8, wherein the non-metallic material is $SiO_2$ or $Au_2S$.

10. The circuit element of claim 8, wherein the nonplasmonic particle does not exhibit resonance upon application of energy of an optical or infrared frequency.

11. An inductor adapted to function in the optical or infrared frequency range, comprising a plasmonic particle disposed on a substrate, said plasmonic particle comprised of a material having a permittivity with a negative real part and adapted to induce inductance upon application of an optical or infrared signal, said plasmonic particle having respective dimensions substantially smaller than a wavelength of an applied optical or infrared signal and having a size and shape that determine the characteristics of the inductor at optical or infrared frequencies, wherein the plasmonic particle performs a function upon application of energy in the optical or infrared frequency range analogous to a function performed by one or more electrical circuit elements upon application of energy in the RF or microwave frequency range.

12. The inductor of claim 11, wherein the plasmonic particle is comprised of a noble metal.

13. The inductor of claim 12, wherein the noble metal is silver or gold.

14. The inductor of claim 11, wherein the plasmonic particle exhibits resonance upon application of energy of an optical or infrared frequency.

15. A capacitor adapted to function in the optical or infrared frequency range, comprising a nonplasmonic particle disposed on a substrate, said nonplasmonic particle comprised of a material having a permittivity with a positive real part and adapted to exhibit capacitance upon application of an optical or infrared signal, said nonplasmonic particle having respective dimensions substantially smaller than a wavelength of an applied optical or infrared signal and having a size and shape that determine the characteristics of the capacitor at optical or infrared frequencies, wherein the nonplasmonic particle performs a function upon application of energy in the optical or infrared frequency range analogous to a function performed by one or more electrical circuit elements upon application of energy in the RF or microwave frequency range.

16. The capacitor of claim 15, wherein the nonplasmonic particle is comprised of non-metallic material.

17. The capacitor of claim 15, wherein the nonplasmonic particle does not exhibit resonance upon application of energy of an optical or infrared frequency.

18. A resistor adapted to function in the optical or infrared frequency range, comprising a plasmonic or nonplasmonic particle disposed on a substrate, said plasmonic or nonplasmonic particle comprised of a material having a permittivity with a positive imaginary part and adapted to exhibit resistance upon application of an optical or infrared signal, said plasmonic or nonplasmonic particle having respective dimensions substantially smaller than a wavelength of an applied optical or infrared signal and having a size and shape that determine the characteristics of the resistor at optical or infrared frequencies, wherein the plasmonic or nonplasmonic particles perform functions upon application of energy in the optical or infrared frequency range analogous to functions performed by one or more electrical circuit elements upon application of energy in the RF or microwave frequency range.

19. A method of forming a circuit element adapted to function at optical or infrared frequencies, comprising:

depositing on a substrate at least one of a plasmonic particle comprised of a material having a permittivity with a negative real part and adapted to induce inductance upon application of an optical or infrared signal or a nonplasmonic particle comprised of a material having a permittivity with a positive real part and adapted to exhibit capacitance upon application of an optical or infrared signal, said plasmonic particle and/or nonplasmonic particle having respective dimensions substantially smaller than a wavelength of an applied optical or infrared signal; and applying energy of an optical or infrared frequency so as to cause a plasmonic particle to function as an inductor and a nonplasmonic particle to function as a capacitor at said optical or infrared frequencies in a manner analogous to inductance and capacitance functions performed by one or more electrical circuit elements upon application of energy in the RF or microwave frequency range.

20. The method of claim 19, wherein the applying energy causes a plasmonic or nonplasmonic particle to function as a resistor at said optical or infrared frequencies in a manner analogous to resistance functions performed by one or more electrical circuit elements upon application of energy in the RF or microwave frequency range.

21. A method of fabricating a circuit adapted to function at optical or infrared frequencies, comprising:
forming a circuit element according to the method of claim 19; and
further depositing an additional particle onto the substrate at a distance sufficiently small so as to permit optical coupling of the particles.

22. The method of claim 21, wherein the distance is less than 1 micron.

23. The method of claim 21, wherein the optically coupled particles are fused and form an interface therebetween.

24. A parallel resonant circuit adapted to function at optical or infrared frequencies, comprising a three-dimensional fused particle, the fused particle comprised of a first portion of plasmonic material having a permittivity with a negative real part and adapted to induce inductance upon application of an optical or infrared signal and a second portion of non-plasmonic material having a permittivity with a positive real part and adapted to exhibit capacitance upon application of an optical or infrared signal, wherein said three-dimensional fused particle is adapted to resonate in response to an optical field created by the optical or infrared frequencies that is applied in a direction parallel to an interface formed between the first portion and second portion, wherein the three-dimensional fused particle performs functions upon application of energy in the optical or infrared frequency range analogous to functions performed by one or more electrical circuit elements upon application of energy in the RF or microwave frequency range.

25. The parallel resonant circuit of claim 24, wherein the three-dimensional fused particle has a ellipsoidal cross-section.

26. The parallel resonant circuit of claim 24, wherein the three-dimensional fused particle is a sphere.

27. The parallel resonant circuit of claim 26, wherein the interface is an equator, the first portion is a first hemisphere, and the second portion is a second hemisphere.

28. A series resonant circuit adapted to function at optical or infrared frequencies, comprising a three-dimensional fused particle, the fused particle comprised of a first portion of plasmonic material having a permittivity with a negative real part and adapted to induce inductance upon application of an optical or infrared signal and a second portion of non-plasmonic material having a permittivity with a positive real part and adapted to exhibit capacitance upon application of an optical or infrared signal, wherein said three-dimensional fused particle is adapted to resonate in response to an optical field created by the optical or infrared frequencies that is applied in a direction normal to an interface formed between the first portion and second portion, wherein the three-dimensional fused particle performs functions upon application of energy in the optical or infrared frequency range analogous to functions performed by one or more electrical circuit elements upon application of energy in the RF or microwave frequency range.

29. The series resonant circuit of claim 28, wherein the three-dimensional fused particle has a ellipsoidal cross-section.

30. The series resonant circuit of claim 28, wherein the three-dimensional fused particle is a sphere.

31. The series resonant circuit of claim 30, wherein the interface is an equator, the first portion is a first hemisphere, and the second portion is a second hemisphere.

32. A nanoscale circuit adapted to function at optical or infrared frequencies, comprising a substrate and disposed on said substrate a plurality of nanoparticles comprised of (1) plasmonic material having a permittivity with a negative real part and adapted to induce inductance upon application of an optical or infrared signal and/or a permittivity with a positive imaginary part and adapted to exhibit resistance upon application of an optical or infrared signal and/or (2) non-plasmonic material having a permittivity with a positive real part and adapted to exhibit capacitance upon application of an optical or infrared signal and/or a permittivity with a positive imaginary part and adapted to exhibit resistance upon application of an optical or infrared signal, the plurality of nanoparticles being deposited onto a substrate so that adjacent nanoparticles are in close enough proximity for optical coupling, wherein the nanoparticles are architected to have sizes and shapes so as to perform a predetermined circuit function at optical or infrared frequencies based on the properties of each one of the plurality of nanoparticles at optical or infrared frequencies, wherein the nanoparticles perform functions upon application of energy in the optical or infrared frequency range analogous to functions performed by one or more electrical circuit elements upon application of energy in the RF or microwave frequency range.

33. The nanoscale circuit of claim 32, wherein the predetermined circuit function is a right-handed transmission line.

34. The nanoscale circuit of claim 32, wherein the predetermined circuit function is a left-handed transmission line.

* * * * *